G. H. YARD.
Whiffletree.
No. 13,712. Patented Oct. 23, 1855.
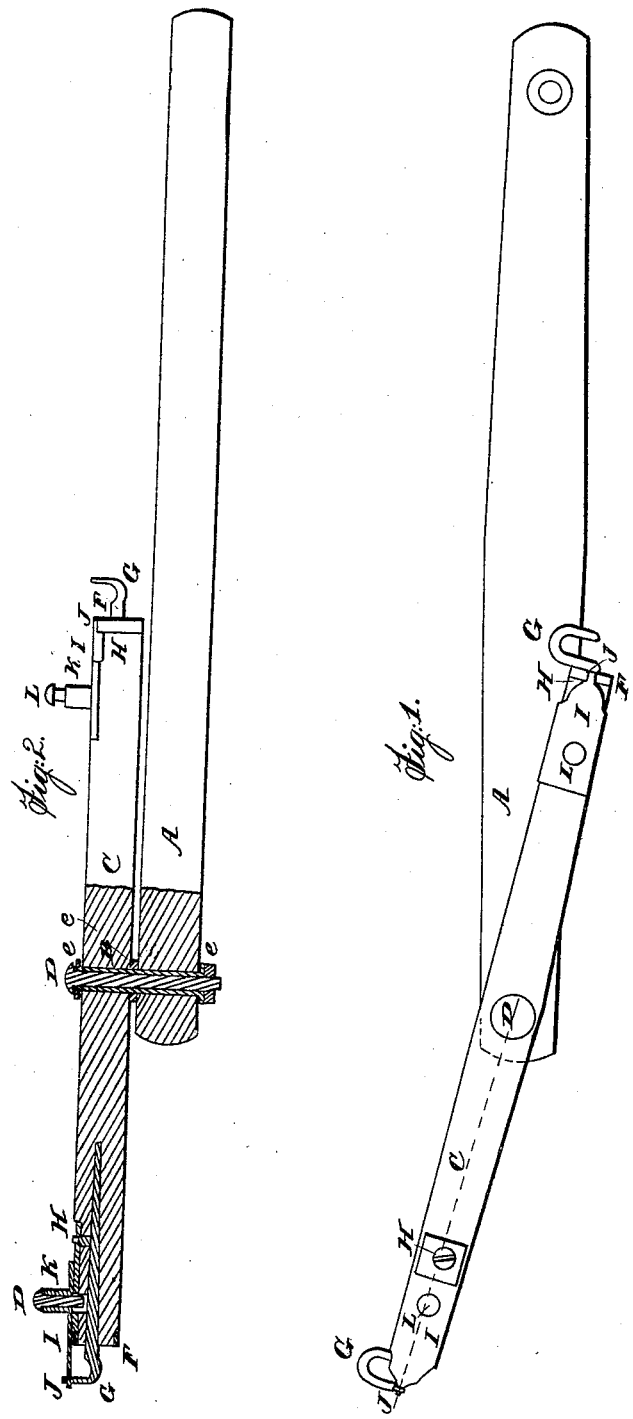

UNITED STATES PATENT OFFICE.

GEO. H. YARD, OF TRENTON, NEW JERSEY.

WHIFFLETREE.

Specification of Letters Patent No. 13,712, dated October 23, 1855.

*To all whom it may concern:*

Be it known that I, GEORGE H. YARD, of Trenton, in the county of Mercer and State of New Jersey, have invented certain new and useful Improvements in Whiffletrees; and I do hereby declare that the same are described and represented in the following specifications and drawings.

To enable others skilled in the art to make and use my improvements I will proceed to describe their construction and use, referring to the drawings in which the same letters indicate like parts in each of the figures.

Figure 1 is a plan of my improved whiffletree connected to a double tree. Fig. 2 is a sectional elevation of the same through the line z, z, of Fig. 1.

The nature of my invention consists in fastening a plate upon the top of the whiffletree at each end, which plate is embraced by a traversing slide provided with a point fitted to a hole in the end of the trace hook. This traversing slide is also provided with a falling or sliding pin, so arranged that when the point of the slide is pushed into the hook, the pin drops into a hole in the plate and prevents the slide from being pushed back, until the pin is raised, thereby preventing the trace from becoming unhooked.

In the above mentioned drawing A, is the end of the double tree with a metal tube B, inserted in it, and made large enough to receive the whiffletree C, upon it as shown in Fig. 2.

The ends of the whiffletree C, are bound by the hoops F, F, and the shanks of the hooks G, G, to which the traces are to be hooked are inserted in the ends of said whiffletree, so as to remain permanently. The metal plate H is fastened on the top of the whiffletree with one end under the hoop F, this plate is made dovetailing and broadest at the top and it is embraced by the traversing slide I, which is fitted to traverse freely on it and provided with a point J, which enters a hole provided for it in the hook G, when the slide is run out after the trace is hitched onto the hook, so as to prevent it from being accidentally unhooked, and endangering the horse, carriage or its contents, or the lives or limbs of the passengers or attendants.

This traversing slide is provided with a hub $k$, with a hole in it made largest at the lower end to which the pin L is fitted so as to traverse freely; and when the slide I, is run back, the end of the pin L, rests on the plate H; but when the slide is run out, the end of the pin L drops into the hole prepared for it in the plate H, as represented in the section Fig. 2, and holds the point J, of the slide in the hole in the hook G, until the pin L, is raised again, which may be readily done by taking hold of its head and pulling it up; and then pushing the slide back in order to unhitch the trace from the hook G. This will be found to be one of the most effectual devices for preventing the traces from becoming unhooked ever devised for that purpose.

I believe I have described the construction, operation and use of my improvements, so as to enable any person skilled in the art to make and use them. I will now specify what I desire to secure by Letters Patent, to wit:

I claim—

The traversing slide I, provided with a point fitted to the hole in the hook G, in combination with a sliding pin L, to fasten it when the end of the slide is put into the hook, to fasten the end of the trace onto the hook substantially as described.

GEORGE H. YARD.

Witnesses:
SAML. P. PARKHAM,
WM. C. HOWELL.